(12) United States Patent
Nagasawa et al.

(10) Patent No.: US 6,327,121 B1
(45) Date of Patent: Dec. 4, 2001

(54) GMR HEAD, METHOD FOR ITS MANUFACTURE, AND MAGNETIC DISC DRIVE UTILIZING THE HEAD

(75) Inventors: Keiichi Nagasawa; Yutaka Shimizu; Hitoshi Kishi; Atsushi Tanaka; Reiko Kondoh, all of Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/191,940

(22) Filed: Nov. 13, 1998

(30) Foreign Application Priority Data

Mar. 19, 1998 (JP) .................................................. 10-069597

(51) Int. Cl.$^7$ ........................................................ G11B 5/39
(52) U.S. Cl. ...................................................... 360/324.11
(58) Field of Search ............................. 360/113, 324.11, 360/324.12, 327.2, 324.1, 314, 324

(56) References Cited

U.S. PATENT DOCUMENTS

| | | | |
|---|---|---|---|
| 4,001,890 | * | 1/1977 | Kayser ................................... 360/121 |
| 5,493,467 | * | 2/1996 | Cain et al. ............................. 360/113 |
| 5,600,518 | * | 2/1997 | Koga ..................................... 360/113 |
| 5,768,071 | * | 6/1998 | Lin ........................................ 360/113 |
| 5,838,521 | * | 11/1998 | Ravipati ............................... 360/113 |
| 5,867,025 | * | 2/1999 | Allenspach et al. ................. 324/252 |
| 6,108,176 | * | 8/2000 | Yokoyama ....................... 360/324.11 |

FOREIGN PATENT DOCUMENTS

| | | | |
|---|---|---|---|
| 694788 | * | 1/1996 | (EP) . |
| 755048 | * | 1/1997 | (EP) . |
| 090 22510 | | 1/1997 | (JP) . |

* cited by examiner

Primary Examiner—David L. Ometz
Assistant Examiner—Angel Castro
(74) Attorney, Agent, or Firm—Greer, Burns & Crain, Ltd.

(57) ABSTRACT

The invention provides a GMR head in which an adequate bias point may be set for the free magnetic layer 12 of the GMR head by suppressing the static magnetic field in the free magnetic layer which arises from a pinned magnetic layer 14 of the GMR head. The GMR head comprises a sensor section 10, a magnetic field correction section 20 disposed laterally adjacent to the sensor section 10. The sensor section 10 includes, in addition to the free magnetic layer 12 and the pinned magnetic layer 14, an intermediate layer 13 and an anti-ferromagnetic layer 15 in a specific arrangement. The magnetic field correction section 20 may have the same structure as the sensor section 10. Because the sensor section 10 and the magnetic field correction section 20 are provided independently and disposed laterally adjacent to each other in the direction of height of the GMR head, the magnetic field emerging from the pinned magnetic layer 14 into the free magnetic layer 12 is suppressed by the magnetic field correction section 20. The magnetic field correction section 20 may be easily formed together and simultaneously with the sensor section 10.

15 Claims, 13 Drawing Sheets

MODEL SINGLE SPIN VALVE STRUCTURE

FIG.3A
HIGH RESISTANCE
FIG.3B
LOW RESISTANCE
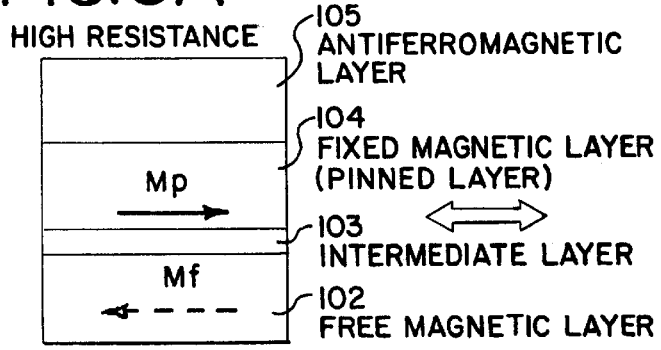
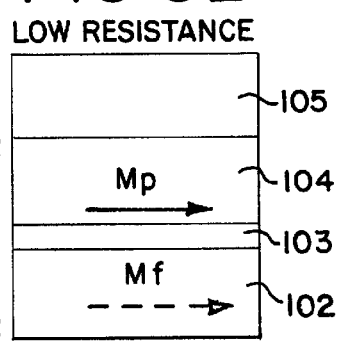
FIG.3C
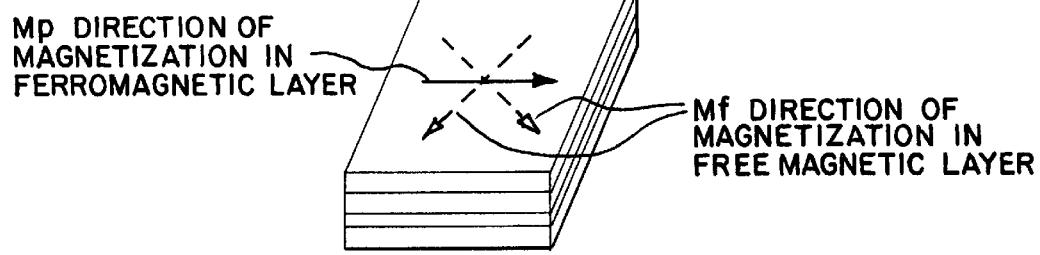
FIG.3D
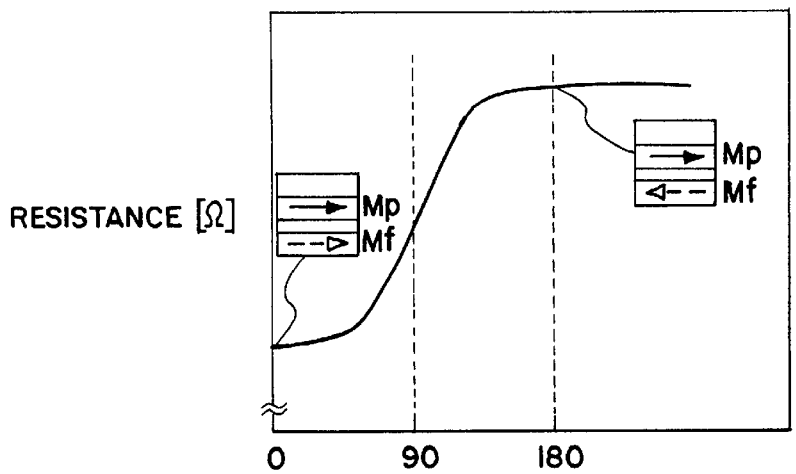

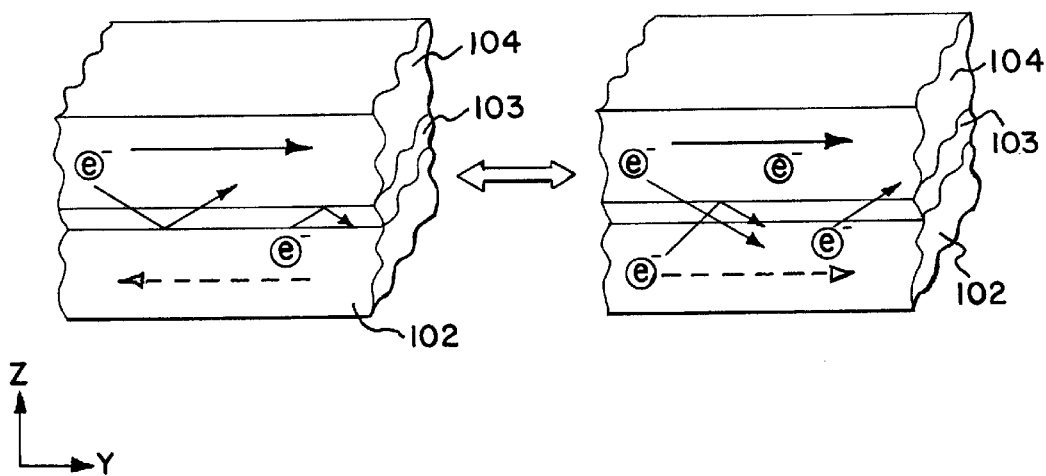
PRINCIPLE OF GMR EFFECT

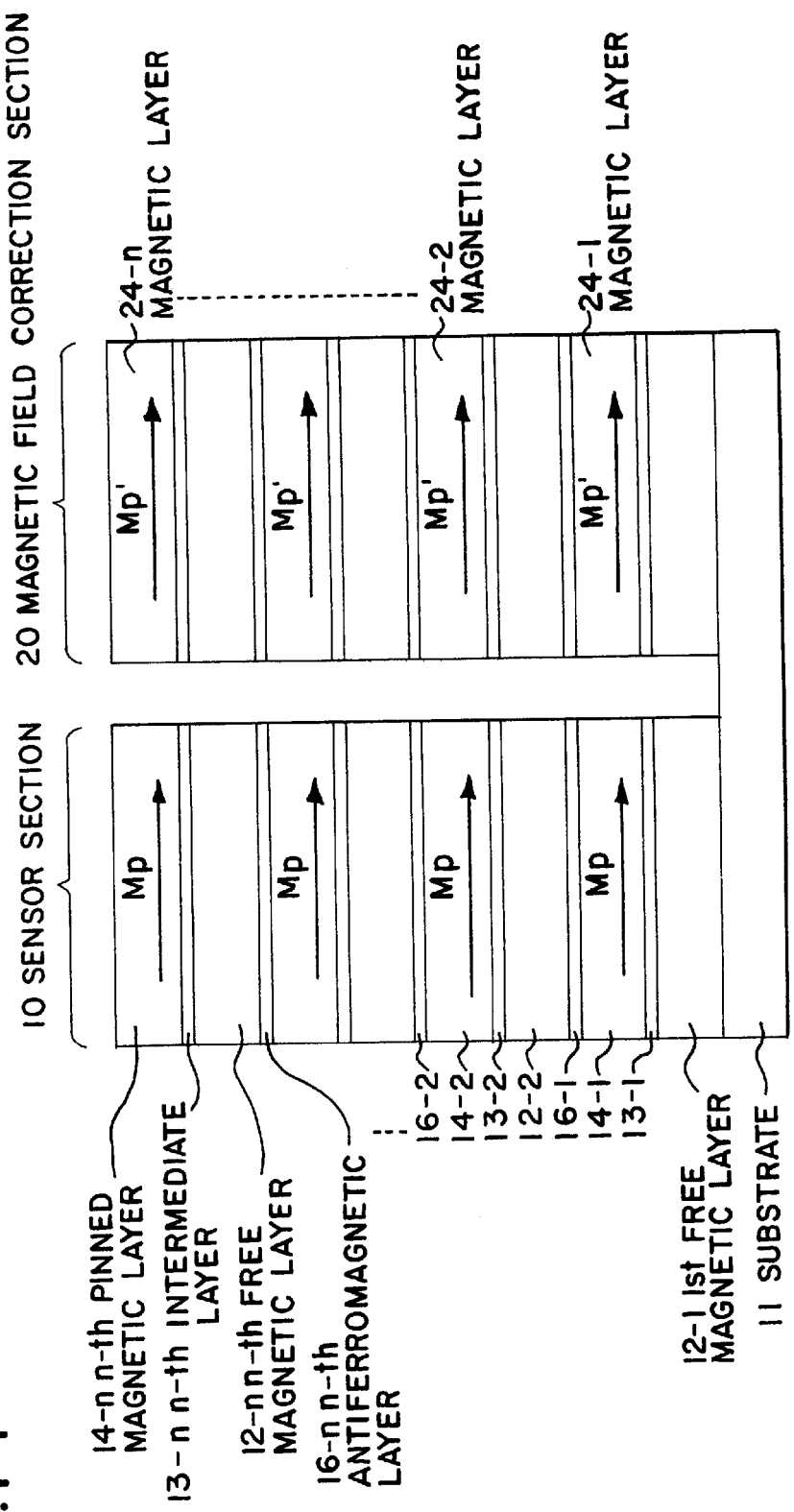

FORMATION OF
SPIN VALVE
FILM & RESIST

ION MILL

FORMATION OF
LAYERS

REMOVAL OF RESIST
(LIFT OFF)

FORMATION OF GAP g
(LIFT OFF OR ION MILL)

MAJOR SECTION OF MAGNETIC DISK DRIVE

GMR HEAD, METHOD FOR ITS MANUFACTURE, AND MAGNETIC DISC DRIVE UTILIZING THE HEAD

BACKGROUND OF THE INVENTION

TECHNICAL FIELD OF THE INVENTION

The present invention relates generally to a GMR head, a method for manufacturing such head, and a magnetic disk drive utilizing such head.

BACKGROUND OF THE INVENTION

In the 1990s, the bit-density of information on a magnetic disk has been extensively improved by a factor of 100 per 10 years. If this rate also holds for years to come, the bit density will be 10 G bits/in$^2$ by the year 2000 or 2001. Recent development in giant magnetoresistive (GMR) head technology seems to achieve this goal.

FIG. 1 shows an overall arrangement of a composite magnetic head 112 utilizing a GMR head for use in a magnetic disk drive, along with a magnetic medium 114 such as a magnetic disk positioned to face the composite head 112. The composite magnetic head 112 shown herein is a merge type head having a "piggy backed structure", which includes a write head 118 located on the back side of a read head 116 whose upper shield 120 also works as a lower write magnet (lower magnetic core) 120 for the write head 118.

The GMR head 100 as shown in FIG. 1 is included in the read head 116. The GMR head comprises a GMR film 122, a pair of electrodes 124a and 124b, a read lower shield 98, and the upper read shield 120, respectively, disposed on the opposite sides of the paired electrodes, respectively.

The write head 118 includes a write coil 128, an organic insulation layer 130 surrounding the write coil 128, a magnetic gap film 132, and an upper write magnetic pole 134 disposed on the upper sides of the organic insulation layer 130 and the magnetic gap film 132, and the lower write magnetic pole 120 disposed on the lower sides of the organic insulation layer 130 and the magnetic gap film 132.

FIG. 2 shows a general arrangement of a GMR head 100. The head 100 includes a spin valve film 122 which consists of a free magnetic layer 102 formed on a substrate 101 which comprises a lower gap film (not shown) formed on a read lower shield 98 (not shown), an intermediate layer 103, a fixed or pinned magnetic layer 104, and an antiferromagnetic or pinning layer 105, as shown in FIG. 2. The GMR head 100 comprises a spin valve film 122 and a pair of electrodes 124a and 124b (refer to FIG. 1) which are preferrably connected with at least the respective ends of the free magnetic layer 102 of the spin valve film 122.

FIGS. 3A–D explain how the electric resistance of the spin valve film 122 changes with magnetization therein. The spin valve film 122 has four layers as shown in FIG. 3A. The two magnetic layers (free and pinned layers) 102 and 104 are intervened by the intermediate non-magnetic layer 103. Provided on the pinned magnetic layer 104 is the antiferromagnetic layer 105, thereby pinning the magnetization Mp in the layer 104 adjacent to the antiferromagnetic layer 105 in the same direction as the magnetization in the boundary or interface region of the antiferromagnetic layer 105 after annealing.

On the other hand, the free magnetic layer 102, separated by the intermediate layer 103, does not assume magnetization in a fixed orientation. In other words, the pinned magnetic layer 104 has a high pinning force or coercivity, while the free magnetic layer 102 has a low pinning force or coercivity, as shown in FIG. 3C.

Under the influence of an external magnetic field, the free magnetic layer 102 is magnetized to the external magnetic field direction, acquiring some magnetization Mf in a direction. It is known that when the magnetizations in the free magnetic layer 102 and pinned magnetic layer 104 make an angle of 180° (that is, they are pointing in the opposite directions, as shown in FIG. 3A), the electric resistance in the spin valve film reaches its maximum.

FIGS. 4A and B illustrate the principle lying behind the GMR head. As shown in FIG. 4A, if the free magnetic layer 102 and the pinned magnetic layer 104 have their magnetization in mutually opposite directions, electrons traveling from one layer into another are likely to be scattered in relatively large numbers by the interlayer between the (non-magnetic) intermediate layer and the magnetic layer, thereby exhibiting high resistivity.

If the magnetization in the free magnetic layer 102 coincides with that in the pinned magnetic layer 104 as shown in FIG. 4B, the scattering of the electrons traveling across the interface layer, or the boundary, between the intermediate (non-magnetic layer) and the magnetic layer is in relative small numbers. To add a further explanation, the traveling electrons each have either a spin up and a spin down, but one of them is more strongly scattered by a given magnetic field. In FIGS. 4A and B, scattering of electrons have occurred, but it is less likely that electrons are scattered in the case shown in FIG. 4B as compared with FIG. 4A, thereby controlling electrons to flow from the pinned magnetic layer 104 into the free magnetic layer 103.

As shown in FIG. 3D, the magnetization Mf in the free magnetization layer of a GMR element having a spin valve structure is varied by the externally applied magnetic field, which is a magnetic field Hsig representative of a signal in the example shown herein. The change in the magnetization in turn results in a change in resistance of the spin valve film 122 of the GMR element in proportion to the cosine of the relative angle theta ($\theta$) between the magnetizations Mf and Mp in the respective free and pinned magnetic layers 102 and 104, respectively, in the range from 0° to 180°.

Accordingly, in a magnetic head utilizing such GMR film 122, if the magnetization Mf in the free magnetic layer 102 is set up in the direction perpendicular (90°) to the fixed or pinned magnetization Mp in the pinned magnetic layer 104 under no externally applied magnetic field, the resistance under an externally applied magnetic field (e.g. signal magnetic field Hsig) will change substantially linearly and symmetrically in the range from 0° to 180°, with a mean value found at theta ($\theta$)=90°. Such symmetrical response in resistance facilitates processing of read signals from the magnetic disk drive.

In an actual spin valve element, however, the free magnetic layer 102 is influenced by not only the externally applied signal magnetic field Hsig, but also a number of noise fields that arise from, for example, the exchange coupling of the magnetic fields of the free magnetic layer 102 and pinned magnetic layer 104, a magnetic field that arises from magnetic poles appearing on the end faces of the pinned magnetic layer 104, and a magnetic field caused by a sense current through the GMR element. As a result, the magnetization in 102 is deviated away from the direction of X axis (along the width of the element), thereby causing the electric resistance of the element to change substantially nonlinearly and non-symmetrically.

In order to orient the magnetization Mf in free magnetic layer 102 along X axis (along the width of the layer) when it is free of any externally applied magnetic field, it is necessary to provide an additional magnetic field, called a biasing field, to cancel out the Y components of the noise fields.

The biasing field depends on the magnitudes and the directions of the noise field. A GMR head element is preferably designed to minimize the required level of such biasing field.

On the other hand, the width w (i.e. dimension in X direction) of a GMR head is determined in accordance with the recording bit density on the magnetic recording medium so that the spin valve element may cover a track on the medium (FIG. 1) and accurately read bit data stored thereon. Hence, the width must have a sufficiently small dimension for the recording magnetic medium with increased bit density.

It is noted that if the height h (the size in the Y direction) of the element is much shorter than the width w, the magnetization Mf in the free magnetic layer 102 tends to be pinned in the longitudinal direction (X direction).

Thus, it is desirable to have the height h equal to or less than the width w. It is also desirable to make the height h less than the width w to ensure the signal magnetic field Hsig to enter the entire element, since otherwise the signal magnetic field Hsig cannot penetrate the element in the Y direction.

In an actual spin valve element in use and having dimensions of a few micrometers x a few micrometers, if the height h is decreased for use with a higher bit density medium, the static magnetic coupling (minus exchange coupling) of the magnetizations in pinned magnetic layer 104 and free magnetic layer 102 plays a relatively important role in aligning the magnetization Mf in the free magnetic layer 102 anti-parallel with the magnetization in the pinned magnetic layer 104, thereby making it difficult to find an appropriate bias point.

On the other hand, if only the width w of the GMR element is minimized, keeping the height h unchanged, the magnetization in the region of the free magnetic layer 102 close to the magnetic recording medium can rotate in response to the externally applied signal magnetic field Hsig, but in the region remote from the magnetic medium the magnetization can be barely rotated by the Hsig and yield no resistance change. Consequently, the remote section of the GMR element contributes little to the read of a signal, so that the overall read sensitivity of the head lowers.

In order to realize a higher bit density, the size of the GMR element is required on one hand to be as small as possible, but on the other hand to find a desirable biasing field the height h must be sufficiently large. Thus, as the second best choice, given a relatively small height h of the GMR element, one might be tempted to find an optimum bias point by providing a minimum sense current in a direction so as to cancel out the noise field. However, there is always a certain limit for the sense current, so the improvement of the bias magnetic field by the sense current alone would not clear the problem.

As an alternative, one might decrease the thickness of the pinned magnetic layer 104 to lower the level of the magnetization influencing on the magnetization in the free magnetic layer. However, this is not recommended, since the pinned magnetic layer 104 must have a certain minimum thickness in order to have its magnetization pinned. As a result the magnetization cannot be arbitrary reduced.

As an another alternative, a thinner (non-magnetic) intermediate layer 103 might be provided between the free magnetic layer 102 and pinned magnetic layer 104 to enhance the ferromagnetic coupling between the two magnetic layers to compensate the static magnetic coupling. The intermediate layer must be then formed to an order of at most 10 Angstroms in thickness, which is impractical to do.

A GMR element having a dual spin valve structure exhibits a relatively large magnetoresistive effect and hence an improved read sensitivity, as will be described in detail in connection with the third example below. However, the two pinned magnetic layers of the element also exhibit larger magnetic flux that leak therefrom affecting the magnetization in the free magnetization layer. In this case, the leakage magnetic field cannot be removed or suppressed by any of the above mentioned measures.

Accordingly, a new measure must be sought to substantially reduce a required level of the bias magnetic field.

SUMMARY OF THE INVENTION

It is therefore an object of the invention to provide a new GMR head free of such leakage magnetic field.

It is another object of the invention to provide a GMR head operable about a properly biased point by reducing the static magnetic field in a free magnetic layer arising from a pinned magnetic layer of the head.

It is a further object of the invention to provide a method for manufacturing a new GMR head.

It is still a further object of the invention to provide a method for manufacturing a GMR head operable at a properly biased point by reducing the static magnetic field of the pinned magnetic layer of the head in the free magnetic layer thereof.

It is still a further object of the invention to provide a magnetic disk drive utilizing any one of the GMR heads as mentioned above.

To this end, in accordance with one aspect of the invention there is provided a GMR head comprising a GMR element including at least a free magnetic layer; an intermediate layer and a pinned magnetic layer, wherein said pinned magnetic layer has a larger length in the direction of the height of said element than said free magnetic layer, thereby reducing the magnetic field in said free magnetic layer arising from the pinned magnetic layer.

With this arrangement, the lines of magnetic field emerging from the poles of the pinned magnetization layer into the free magnetization layer may be reduced, so that the unwanted stray magnetic field arising from the pinned magnetic layer and entering the free magnetization layer may be reduced, which in turn results in a reduction of the bias magnetic field mentioned above.

In accordance with another aspect of the invention, there is provided a GMR head comprising;

a sensor section including a GMR element; and a magnetic field correction section arranged independently and laterally in the direction of height of said element, wherein said sensor section has at least a free magnetic layer, an intermediate layer and a pinned magnetic layer, and the magnetic field correction section has at least an independent magnetic layer which is arranged laterally in the direction of height of said element, thereby reducing the magnetic field in the free magnetic layer arising from the pinned magnetic layer.

In accordance with still another aspect of the invention, there is provided a GMR head comprising;

a sensor section including a GMR element; and an independent magnetic field correction section which is disposed laterally in the direction of height of said element, wherein said sensor section has at least a free magnetic layer, an intermediate layer and a pinned magnetic layer, and said magnetic field correction section has substantially the same structure as the sensor section.

It should be noted that the magnetic field correction section and the sensor section have the same structure and are placed side by side in the direction of height of the GMR element. Consequently, the magnetic field correction film may be easily formed together with the sensor film.

The invention provides a longer pinned magnetic layer than the free magnetic layer, reducing the influence of the pinned magnetic field layer on the magnetization in the free magnetic layer, thereby reducing the biasing magnetic field.

In this spin valve structure, the pinned magnetic layer has magnetically much less influence on the free magnetic layer. Consequently, the free magnetization layer is magnetically little aligned in anti-parallel with the pinned magnetization layer. Without any externally applied signal magnetic field, therefore, the magnetization in the free magnetic layer can be set substantially perpendicular to that of the pinned magnetic layer.

The principle of the invention may be applied to various types of GMR heads, as described below.

For example, in accordance with still another aspect of the invention, there is provided a GMR head having generally the same features as described above, wherein the sensor section of the GMR head has, in addition to a free magnetic layer, an intermediate layer and a pinned magnetic layer, at least one spin valve film including an antiferromagnetic layer.

The sensor section may be a single spin valve structure comprising the free magnetic layer, the intermediate layer, the pinned magnetic layer, and the antiferromagnetic layer formed on a substrate in the order mentioned.

Further, the sensor section may be a reverse single spin valve structure comprising the antiferromagnetic layer, the pinned magnetic layer, the intermediate layer, and the free magnetic layer, formed on a substrate in the order mentioned.

Alternatively, the sensor section may have a dual spin valve structure comprising a first antiferromagnetic layer, a first pinned magnetic layer, a first intermediate layer, and a free magnetic layer, a second intermediate layer, a second pinned magnetic layer, and a second antiferromagnetic layer, formed on a substrate in the order mentioned.

In the GMR head, the sensor section may have an alternative form in which multiple sets of layers are formed on a substrate, each set comprising a free magnetic layer, an intermediate magnetic layer, and a pinned magnetic layer, and each set separated from its neighboring set by a non-magnetic layer.

In each of these GMR heads, in order to allow the magnetic field correction section to function properly, both the sensor section and the magnetic field correction section are preferably separated by a distance of not more than 0.1 micrometers ($\mu$m) in the direction of the height of the head. The distance is ideally about 0.01 micrometers ($\mu$m).

In accordance with a further aspect of the invention, there is provided a method for manufacturing a GMR head, comprising a step of forming a spin valve film by successively depositing:

at least a free magnetic layer on a substrate;

an intermediate layer on the free magnetic layer;

a pinned magnetic layer on the intermediate layer; and an antiferromagnetic layer on the pinned magnetic layer, and a step of separating the spin valve film into two sections at an intermediate height of the spin valve film.

In this GMR head, the step of separating the spin valve film at an intermediate height is preferably carried out by an ion-milling technique.

In accordance with a still further aspect of the invention, there is provided a magnetic disk drive, comprising:

at least one of the GMR heads mentioned above;

a magnetic disk disposed to face the GMR head; and a control mechanism for controlling the GMR head and said magnetic disk.

BRIEF DESCRIPTION OF THE DRAWINGS

The foregoing and other objects features and advantages of the present invention will be apparent from the following detailed description of the preferred embodiments of the invention reference being made to the accompanying drawings in which like reference numerals indicate like parts and in which:

FIGS. 3A through 3D are figures useful in explaining the operation of a spin valve element;

FIGS. 4A and 4B are figures useful in explaining the giant magnetoresistive effect observed in a spin valve magnetic element.

FIG. 14 is a cross section of a GMR element having a super-lattice;

PREFERRED EMBODIMENTS OF THE INVENTION

Figure 1:
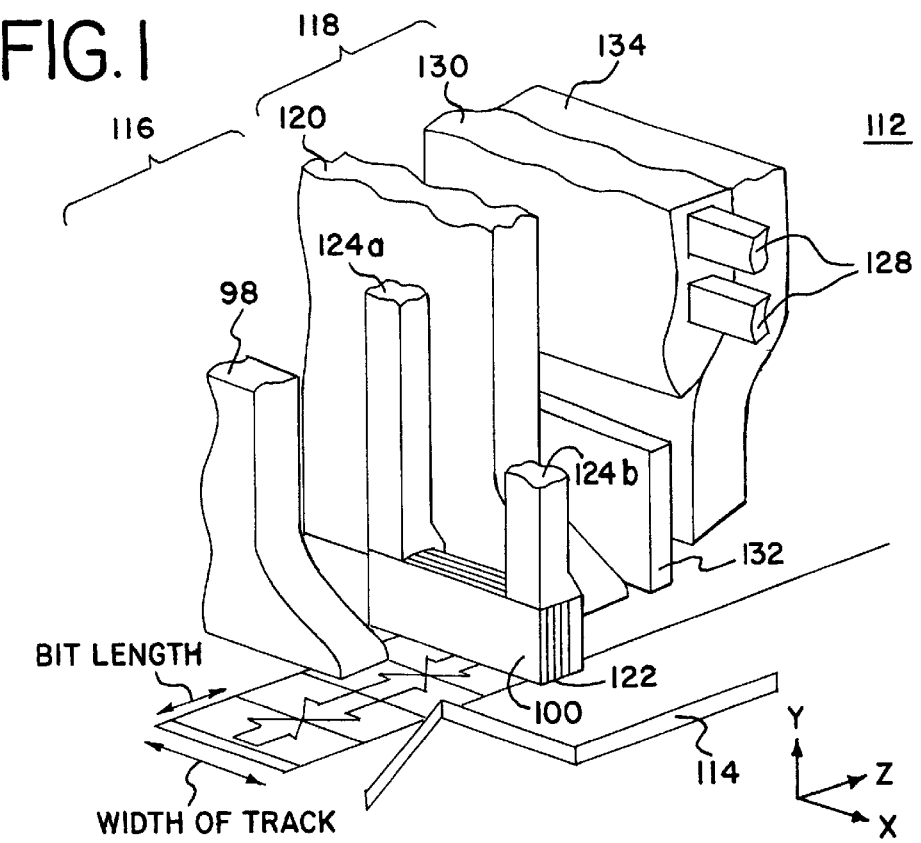
FIG. 1 is a schematic view of a major portion of a composite GMR head and a magnetic disk.
Figure 2:
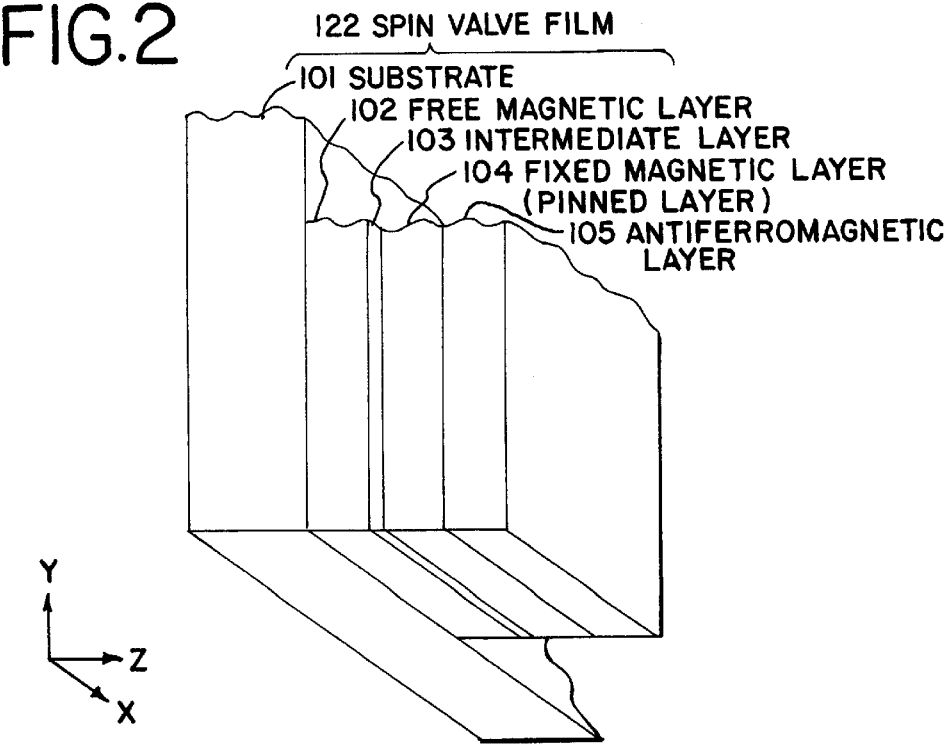
FIG. 2 is a figure useful in explaining a spin valve element.

The invention will now be described by way of example with reference to accompanying drawings regarding four preferred GMR elements, a method for manufacture a GMR head utilizing such element, and a magnetic drive, in which like reference numerals represent like or corresponding elements throughout the figures, for which detailed description will not be repeated for brevity.

The principle of the invention is embodied in the GMR element as described below, in which, provided laterally adjacent to a first pinned magnetic layer of a sensor section of the head and at a higher position than the first pinned magnetic layer, is a second magnetic layer. The second magnetic layer is magnetized in the same direction as the first pinned magnetic layer, so that the influence of the magnetic field emerging from the first pinned magnetic layer into a free magnetic layer is minimized, thereby providing an improved bias point for the free magnetic layer. In what follows, a further description will be given as how the principle is applied in the first through fourth embodiments of the invention.

[GMR Head]

FIRST EXAMPLE

Figure 5:
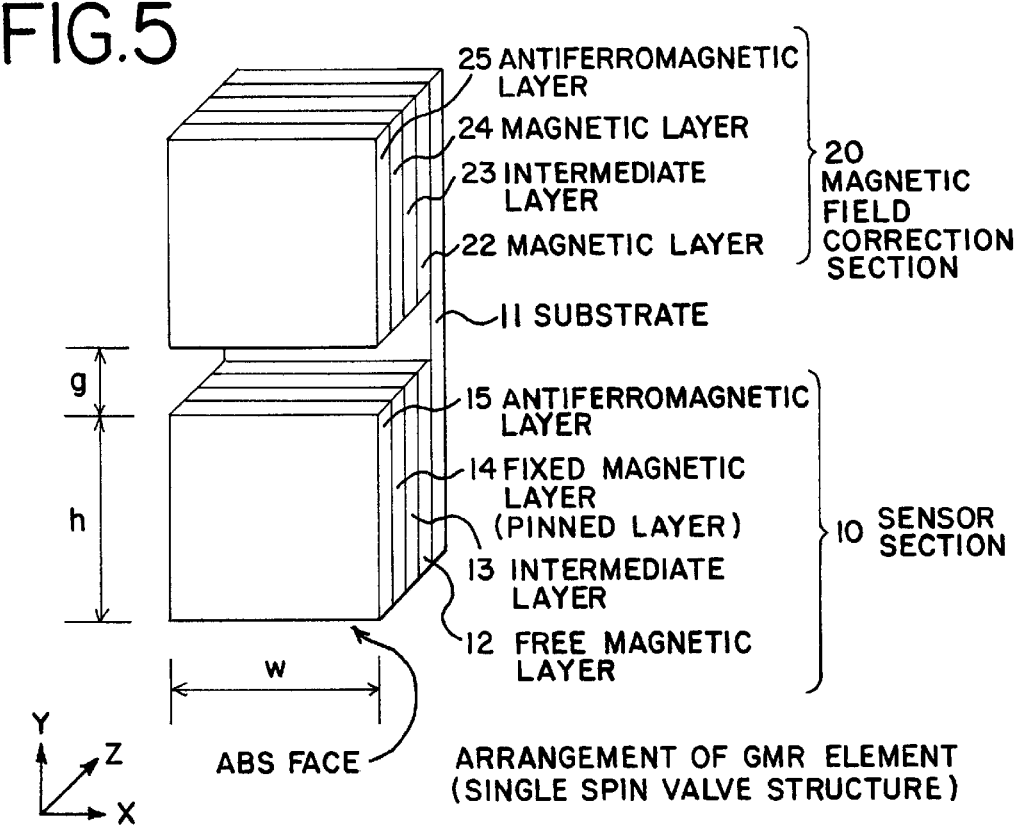
FIG. 5 is a figure showing a typical GMR element having a single spin valve structure according to the invention.
Figure 10:
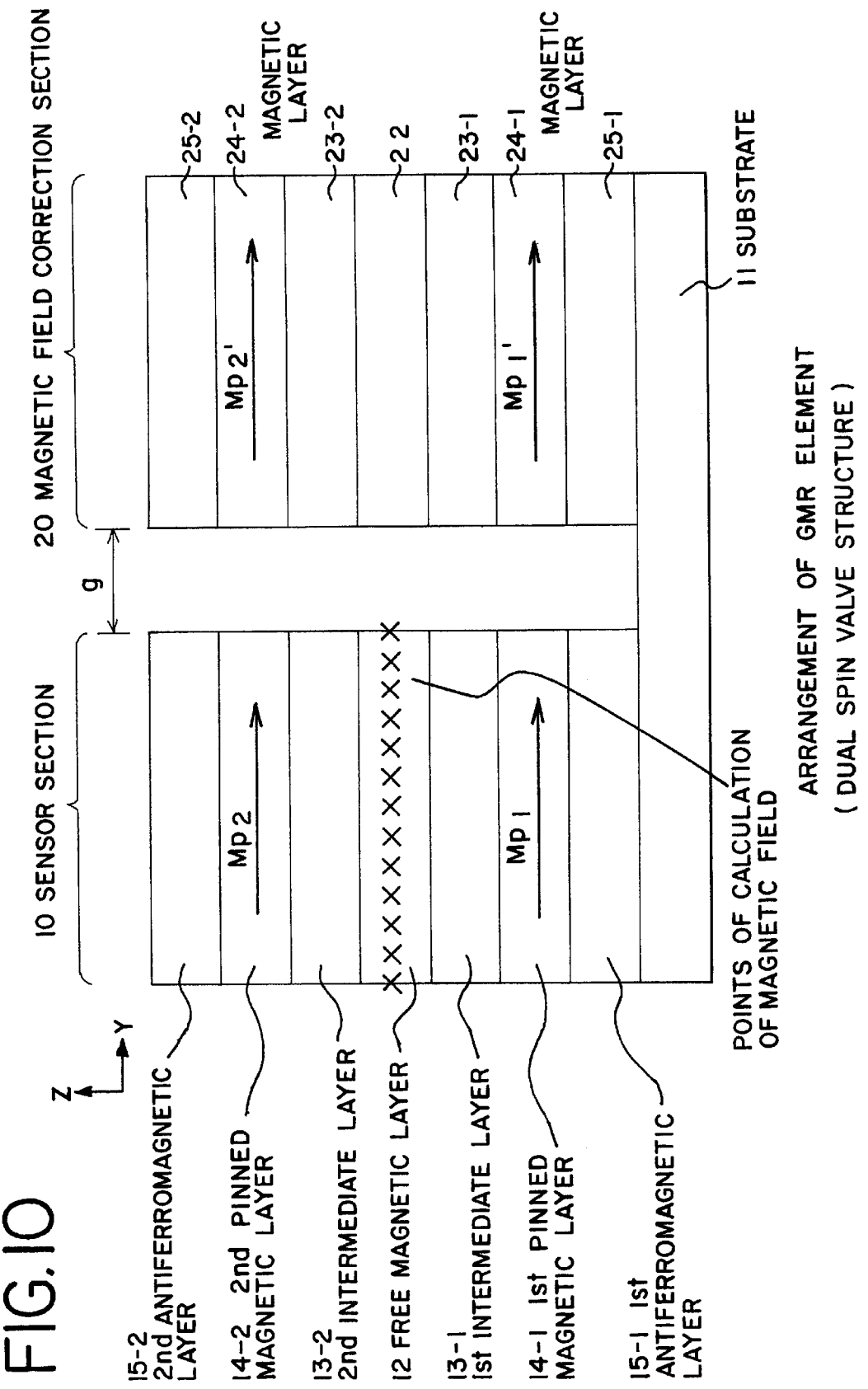
FIG. 10 is a cross section of a GMR element having a dual spin valve structure.

FIG. 5 illustrates the structure of a first GMR element. The GMR element is referred to as a single spin valve GMR element (hereinafter referred to as single spin valve element) because it has a sensor section 10 of singular structure, in contrast to a dual structure in a spin valve element as shown in FIG. 10.

As shown in FIG. 5, the single spin valve element has a sensor section 10 and a magnetic field correction section 20 formed on a substrate 11. This element differs from a typical prior art spin valve element in that the element of the invention further includes a magnetic field correction section 20.

The sensor section 10 includes, in addition to the substrate 11, a free magnetic layer (often referred to as free layer) 12 formed on the substrate 11, a non magnetic intermediate layer 13 formed on the free layer, and a pinned magnetic layer (often referred to as pinned layer) 14 formed on the intermediate layer 13, and an antiferromagnetic layer (also referred to as pinning layer) 15 formed on the pinned layer 14.

The antiferromagnetic layer 15 is provided to fix or pin the magnetization of the adjacent pinned magnetic layer 14 in a fixed orientation. Without the antiferromagnetic layer 15, the magnetization in the pinned magnetic layer 14 is likely to be reoriented by an externally applied magnetic field. However, if the pinned magnetic layer 14 is made of a hard magnetic material, the direction of the magnetization therein will be firmly fixed, and the antiferromagnetic layer 15 will not be needed. Generally speaking, however, it is advantageous to add the antiferromagnetic layer 15 to make the GMR element magnetically stable.

In discussing the configuration of the GMR element, Cartesian XYZ coordinate system is used, in which X axis is defined as being in the direction of the width of the magnetic track facing the air bearing (ABS) surface of the GMR head, Y axis as being the height of the GMR element, i.e. in the direction away from the ABS, and Z axis in the direction normal to the layers i.e. along the track. Provided between the sensor section 10 and the magnetic field correction section 20 is a space or gap g. A typical sensor section 10 has a width w=0.3 micrometers ($\mu$m), a height h=0.3 micrometers ($\mu$m), and a gap g=0.05 micrometer ($\mu$m).

In the example shown herein, the various components mentioned above have the following configurations.

The substrate 11 has an insulating lower gap film formed on a read lower shield layer (FIG. 1), which film is coated with a thin tantal (Ta) underlayer of about 50 Angstroms (Å) to furnish a flat surface on the insulating film.

The free magnetic layer 12, shown as if it were a single layer in FIG. 5, actually consists of two layers, one being a thin Ferrite-Nickel (NiFe) film about 40 Angstroms (Å) thick and another being a thin Cobalt-ferrite (CoFe) film about 25 Angstroms (Å) thick.

The non-magnetic intermediate layer 13 is a thin film of magnetic copper (Cu) layer having a thickness of about 24 Angstroms (Å).

The pinned magnetic layer 14 is a thin cobalt-ferrite film, which has the same composition as the free magnetic layer 12, but has a thickness of about 22 Angstroms (Å).

The antiferromagnetic layer 15 is a thin film of about 250 Angstroms (Å) thick Palladium-Platinum-Manganese (PdPtMn).

The magnetic field correction section 20 may have the same structure as the substrate 11. It should be noted, however, that the necessary components in carrying out the invention are magnetic layer 24 that corresponds to the pinned magnetic layer 14 of the sensor section 10. Other components are not necessarily needed. The magnetic field correction section 20 of the single spin valve element shown herein has the same structure as the substrate 11 simply because it can be fabricated easily and simultaneously in the same manufacturing process as the sensor section 10.

Although the exemplary magnetic field correction section 20 has the same structure as the substrate 11, the "free" layers and "pinned" layers are irrelevant in the magnetic field correction section 20, so that the irrelevant layers are denoted by material names without functional names "free" and "pinned".

The magnetic field correction section 20, thus, comprises a magnetic layer 22 formed on the same substrate 11 as for the sensor section 10, a non-magnetic intermediate layer 23 formed on the magnetic layer 22, a magnetic layer 24 formed on the non-magnetic intermediate layer 23, and an antiferromagnetic layer 25 formed on the magnetic layer 24, all formed in the order mentioned. The compositions, thicknesses, and the external dimensions of each layer may be the same as the corresponding components of the sensor section 10.

Figure 6:
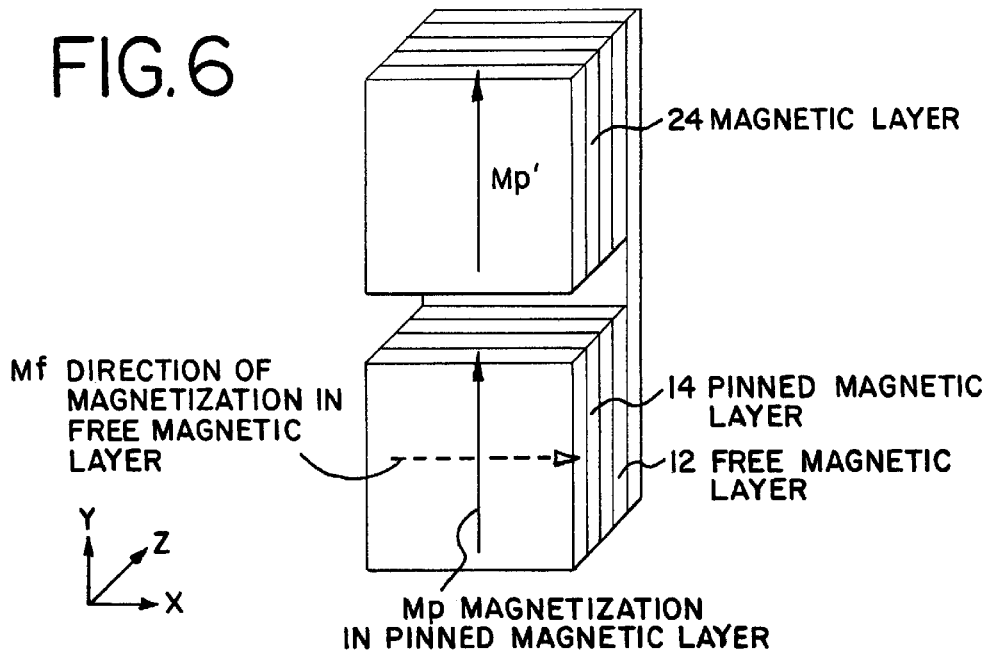
FIG. 6 illustrates magnetization in the pinned magnetic layer of the single spin valve structure shown in FIG. 5.

FIG. 6 illustrates how a magnetization Mp is formed in the pinned magnetic layer 14 in the sensor section 10. The pinned magnetic layer 14 is normally magnetized with its magnetization MP pinned or oriented in Y axis as shown in FIG. 6 by a solid arrow. Pinning of the magnetization is done at the final stage of its manufacture by first heat treating the antiferromagnetic layer 15 under the influence of an external magnetic field. Due to magnetic exchange interaction or magnetic exchange coupling, the magnetization in the pinned magnetic layer 14 underlying the antiferromagnetic layer 15 is then pinned in the same orientation as the magnetization in the boundary or interface region of the antiferromagnetic layer.

The magnetic field correction section 20 has the same structure and is manufactured through the same processes as the sensor section 10, as described above, so that the magnetic layer 24 corresponding to the pinned magnetic layer 14 has a magnetization Mp' oriented in the same direction as the magnetization Mp in the pinned magnetic layer 14. It should be understood, however, that magnetic layer 24 needs not be magnetized during its fabrication. The magnetization Mp' is merely a natural outcome of simultaneous fabrication of the two layers 14 and 24, in which a magnetic field of the layer 14 tends to pin the magnetic layer 24 when the magnetization Mp is pinned in the magnetic layer 14 as shown in FIG. 6.

The free magnetic layer 12 of the sensor section 10 is set to have its magnetic domains oriented in the direction of X axis which is at 90° to the magnetization Mp in the pinned magnetic layer 14 (shown by a dotted arrow in the figure). However, the magnetic domains are only weakly bounded in that direction, so that the magnetization Mf may be easily re-oriented in a different direction by an external perturbation. That is, the pinned magnetic layer 14 has a very high pinning force or coercivity, while the free magnetic layer 12 has a very low pinning force or coercivity.

Thus, when the GMR element is subjected to a signal magnetic field Hsig applied externally from the magnetic disk (not shown), the magnetization Mf is rotated by the magnetic field. When the angle $\theta$ that the magnetization Mf of the free magnetic layer 12 makes with the magnetization Mp in the pinned magnetic layer 14 is 180°, the electric resistance of the spin valve film becomes maximum. When the angel $\theta$ is zero, the electric resistance becomes minimum. The electric resistance varies as the cosine of $\theta$ (cos $\theta$).

By providing the spin valve element with a sense current (constant current) from a pair of electrode films (refer to FIG. 15) formed at the opposite ends of the spin valve element, a change in electric resistance in the spin valve element caused by the field Hsig may be detected in the form of a voltage change across the spin valve element.

Figure 7:
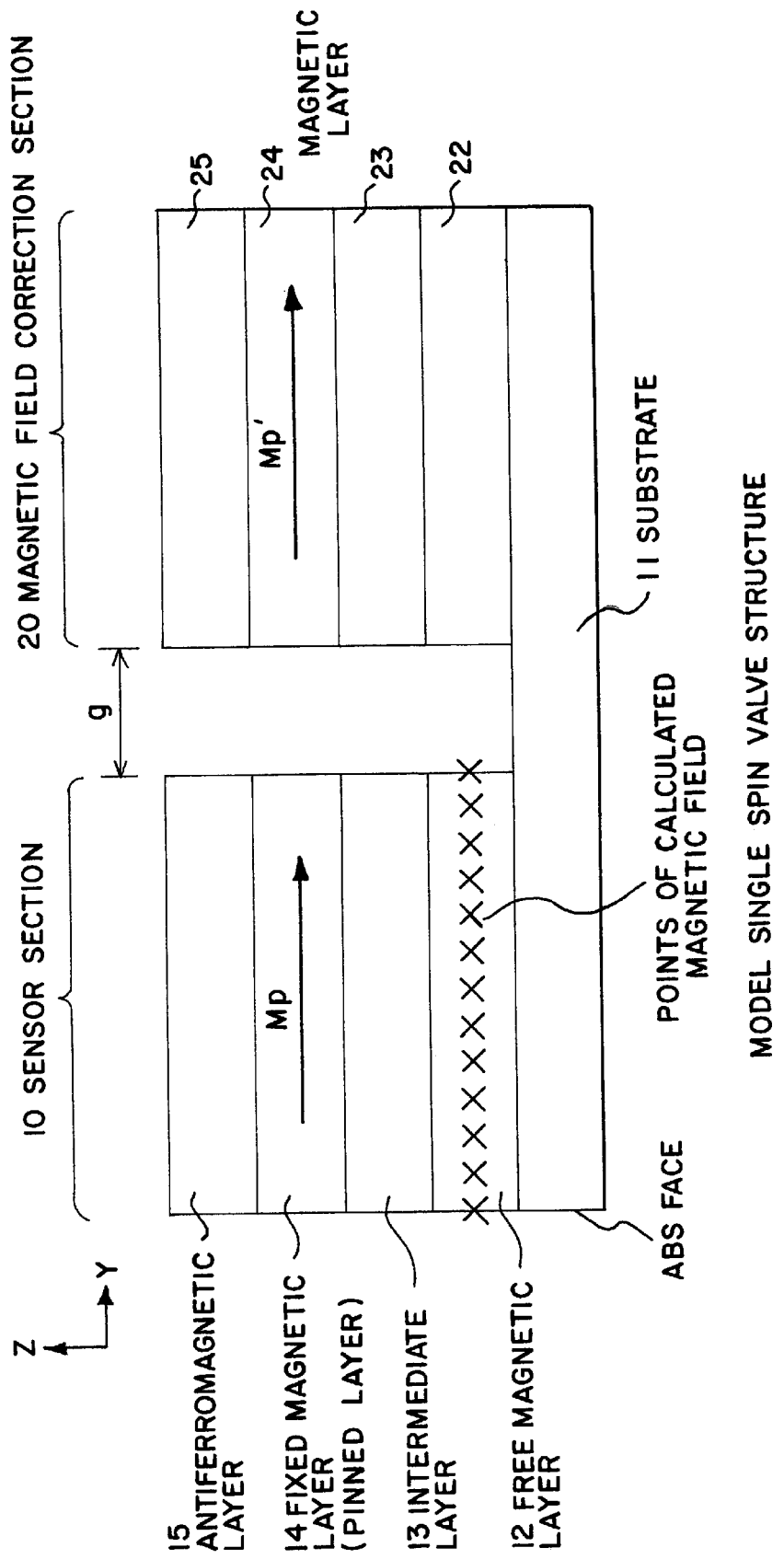
FIG. 7 is a cross section of a modeled single spin valve structure used in calculating the distribution of the magnetic field in the free magnetic layer of the GMR element.

FIG. 7 illustrates a schematic cross section of a single spin valve element taken on the Z-Y plane. In order to investigate the influence of the magnetic field from the pinned magnetic layer 14 on the free magnetic layer 12, the inventors calculated the intensity of the magnetic field in direction of the width of the element (along X axis) at and near the central positions of the free magnetic layer 12, as marked by crosses (x) in the figure.

Figure 8:
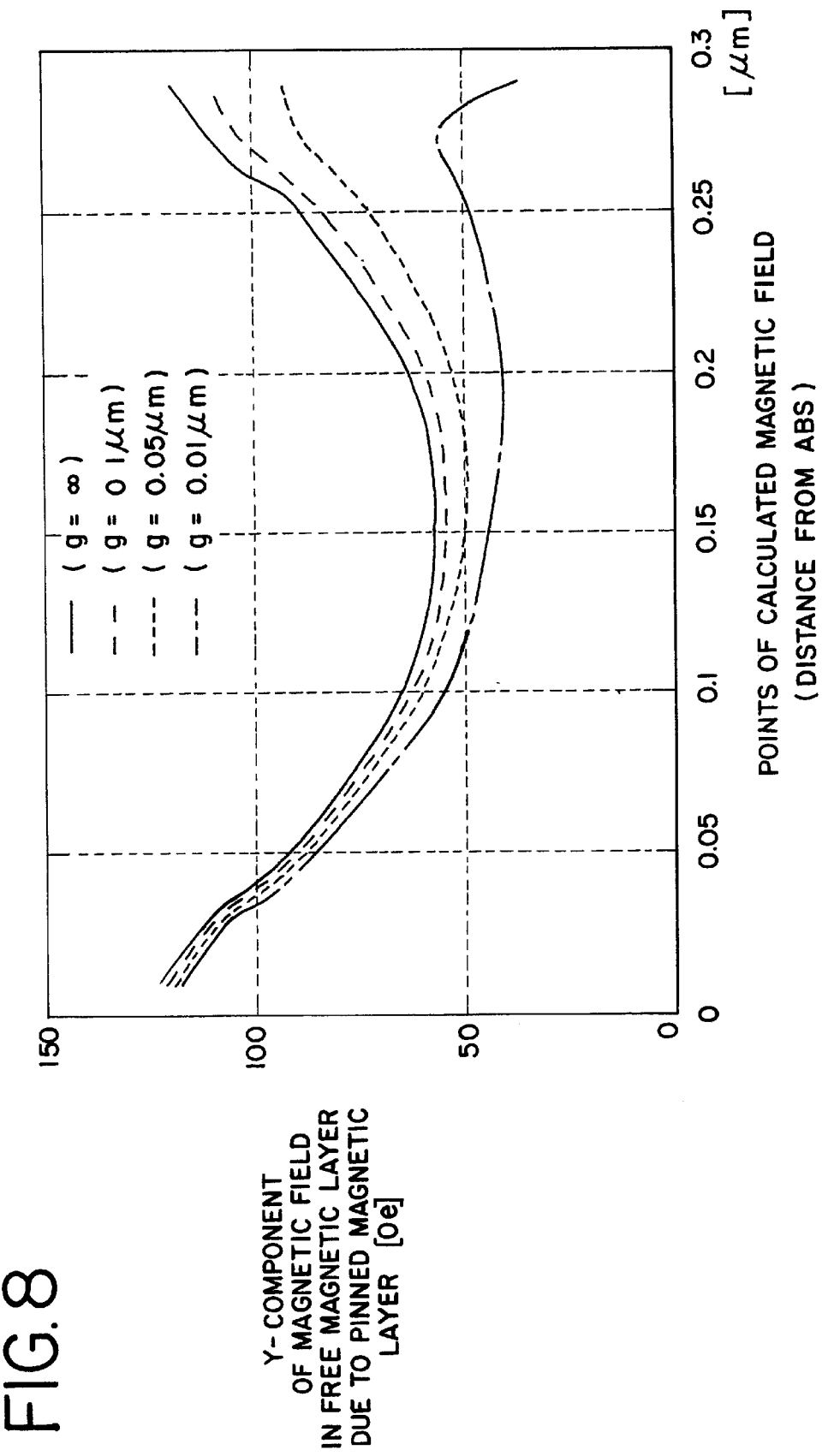
FIG. 8 is a graph showing the calculated distribution of magnetic field in the free magnetic layer in the single spin valve structure shown in FIG. 5, which is useful in understanding the single spin valve structure.

FIG. 8 shows the results of such calculations based on the single spin valve model as shown in FIG. 7. The calculations were made through numerical integration using a commercially available application software. The abscissa of the graph indicates the distance from the ABS (air bearing surface). The distance of 0.3 micrometers ($\mu$m) corresponds to the height of the sensor section 10 and the surface of the magnetic field correction section facing the ABS. The ordinate indicates Y component of the magnetic field at marked positions (FIG. 7) in the free magnetic layer 12 in unit of Oersted (Oe) due to the pinned magnetic layer 14. The characteristic curves shown in FIG. 8 are plotted for different values of gap width g.

of theses characteristic curves, the solid line curve represents a prior art case having no magnetic field correction section 20, which corresponds to the case with g=$\infty$. The broken curve represents a case for g=0.1 micrometers ($\mu$m); and the dotted line curve for g=0.01 micrometers ($\mu$m).

It could be seen in FIG. 8 that the GMR element having a magnetic field correction section 20 has a suppressed magnetic field in the free magnetic layer 12 as compared with the prior art GMR element having no magnetic field correction section 20 (solid line). Furthermore, the magnetic field in the free magnetic layer 12 is better suppressed by the magnetic field correction section 20 which is closer to the associated sensor section 10. For example, if the element has no magnetic field correction section 20 adjacent to the sensor section (g=$\infty$), the magnetic field in the free magnetic layer 12 due to the pinned magnetic layer 14 is 58 Oe at an intermediate position (which is 0.15 micrometers ($\mu$m) from the bottom of the GMR element). In contrast, corresponding magnetic field at the intermediate position is 54 Oe for g=0.1 micrometers ($\mu$m); 50 Oe for g=0.05 micrometers ($\mu$m); and 43 Oe for g=0.01 micrometers ($\mu$m). In other words, the smaller the gap g is, the lesser is the magnetic field in the free magnetic layer 12.

It is noted that the magnetic field in the free magnetic layer 12 due to the pinned magnetic layer 14 is reduced from 58 Oe (prior art) to 43 Oe at the intermediate height of the element, for g=0.01 micrometers ($\mu$m).

With a single spin valve structure as shown in FIG. 7, the free magnetic layer 12 is superposed on the pinned magnetic layer 14 with an intervening layer 13 between them. Across the intermediate layer 13, the free magnetic layer 12 undergoes an interlayer coupling with the pinned magnetic layer 14 through magnetic exchange coupling. The magnitude of the exchange coupling is about 20 Oe when the thickness of the intermediate layer 13 is about 24 Angstroms (Å). It should be noted that the magnitude of the magnetic exchange coupling does not depend on the magnetic field correction section 20 or the magnetic layer 24, and remains the same as long as the arrangement of the free magnetic layer 12, the intermediate layer 13, and the pinned magnetic layer 14 are not changed.

Thus, by subtracting the exchange coupling field from the calculated field, the biasing magnetic field to be applied is found to be 23 Oe, which is smaller than 38 Oe by about 40%. The reduction in the biasing field is believed to be interpreted due to the presence of the magnetic layer 24 disposed laterally adjacent to the sensor section 10 of the GMR element, weakening the magnetic exchange coupling of the pinned layer 14 with the free layer 12.

It would be understood that in this example also the same result could be obtained without pre-magnetizing the magnetic layer 24 in a specified direction, since the magnetic layer 24 would be eventually so magnetized by the magnetic field emerging from the pinned magnetic layer 14.

Figure 12A:
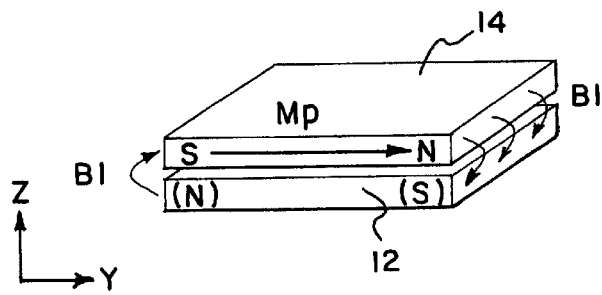
FIGS. 12A and 12B depict magnetization in the free magnetic layer of the GMR element as shown in FIG. 7.

FIGS. 12A and B depict the features of the GMR element in a simplified manner, in which, for simplicity, all the components other than free magnetic layer 12 and pinned magnetic layer 14 of sensor section 10 as well as magnetic layer 24 of magnetic field correction section 20 have been abbreviated. As shown in FIG. 12A, the pinned magnetic layer 14 is fixedly magnetized in the positive Y direction. Formed around the pinned magnetic layer 14 is a magnetic field. A large part of the magnetic flux B1 emerging from the magnetic layer 14 (such flux referred to as leak flux) would extend into the free magnetic layer 12 if the magnetic field correction section 20 were not provided as in the prior art GMR element. Similarly, a large part of the magnetic flux leaking from the free magnetic layer 12 reaches the pinned magnetic layer 14. Consequently, although free magnetic layer 12 should ideally be magnetized in X direction, it tends to be magnetized in the negative y direction without the magnetic layer 24.

Figure 12B:
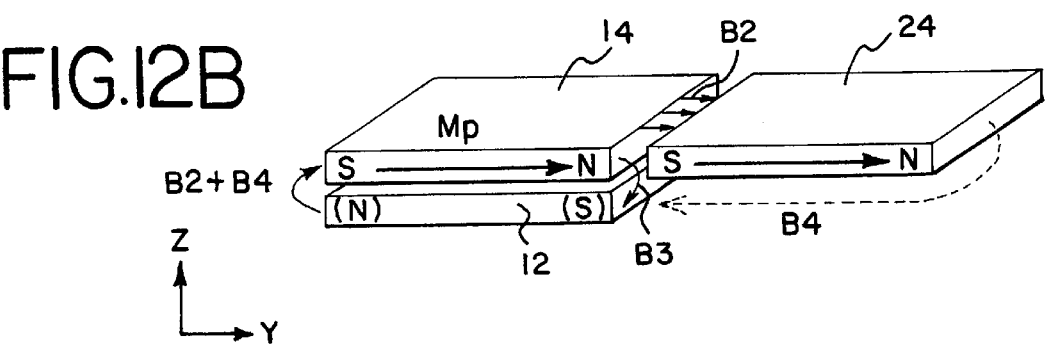

FIG. 12B illustrates a case in which the magnetic layer 24 is disposed laterally adjacent to (i.e. lateral in Y direction); and spaced apart by a small distance from, the pinned magnetic layer 14. The magnetic layer 24 is generally fabricated in the same manufacturing processes as the pinned magnetic layer 14, so that the magnetic layer 24 is fixedly magnetized in the same direction (Y direction) as pinned magnetic layer 14. In this case, a large part of the leak magnetic flux B2 from the magnetic layer 14 reaches the magnetic layer 24, so that only a minor part of the leak flux B3 from the pinned magnetic layer 14 reaches the free magnetic layer 12.

The magnetic flux B4 leaking from the other end of magnetic layer 24 reaches free magnetic layer 12, but the magnetic flux density thereof is diminished to one fourth at the free magnetic layer 12, since magnetic flux density is inversely proportional to the square of the distance and the distance between magnetic layer 24 and free magnetic layer 12 is in general more than twice the distance between the pinned magnetic layer 14 and the free magnetic layer 12.

As a result, the magnetic field that the free magnetic layer 12 receives from the pinned magnetic layer 14 is greatly reduced by the presence of the magnetic layer 24, minimizing possible re-magnetization of the free magnetic layer 12 in the negative Y direction. In this manner, the magnetic layer 24 of the magnetic field correction section 20 facilitates magnetization in the free magnetic layer 12 at the ideal angle of 90° relative to the magnetization in the pinned magnetic layer 14.

It should be understood, however, that the magnetic layer 24 needs not be pre-magnetized, for it is easily magnetized by the magnetic field of the pinned magnetic layer 14 in the positive Y direction.

The spacing g is intended to provide the magnetic layer 24 laterally adjacent to the pinned magnetic layer 14. However, it can be seen from FIG. 12B that the spacing g between the sensor section 10 and the magnetic field correction section 20, or the spacing between the pinned magnetic layer 14 and the magnetic layer 24, may be reduced to zero without losing the merit of magnetic field correction section 20. In this sense, a single spin valve structure of the invention may be characterized by a pinned magnetic layer 14 which extends farther in the positive Y direction (in the direction of height of the GMR element) than the free magnetic layer 12.

The spacing g is intended to make the magnetic layer 24 independent of the pinned magnetic layer 14. Since, however, it is rather difficult to fabricate the magnetic layer 24 independently of the pinned magnetic layer 14 and since the spacing g is not inevitable, it is advantageous to fabricate them together, connected in an end-to-end relationship, on the same substrate as will be seen in the second example that will be described shortly.

In summary, in the GMR head of the invention, a magnetic field correction section is provided laterally adjacent to the sensor section such that the magnetic field correction section has a magnetic layer adapted to be magnetized in the same direction as in the fixed magnetic layer of the sensor section, so that the leak field of the sensor section is weakened by the magnetic field correction section, thereby allowing for an appropriate bias design for the sensor section.

SECOND EXAMPLE

Figure 9:
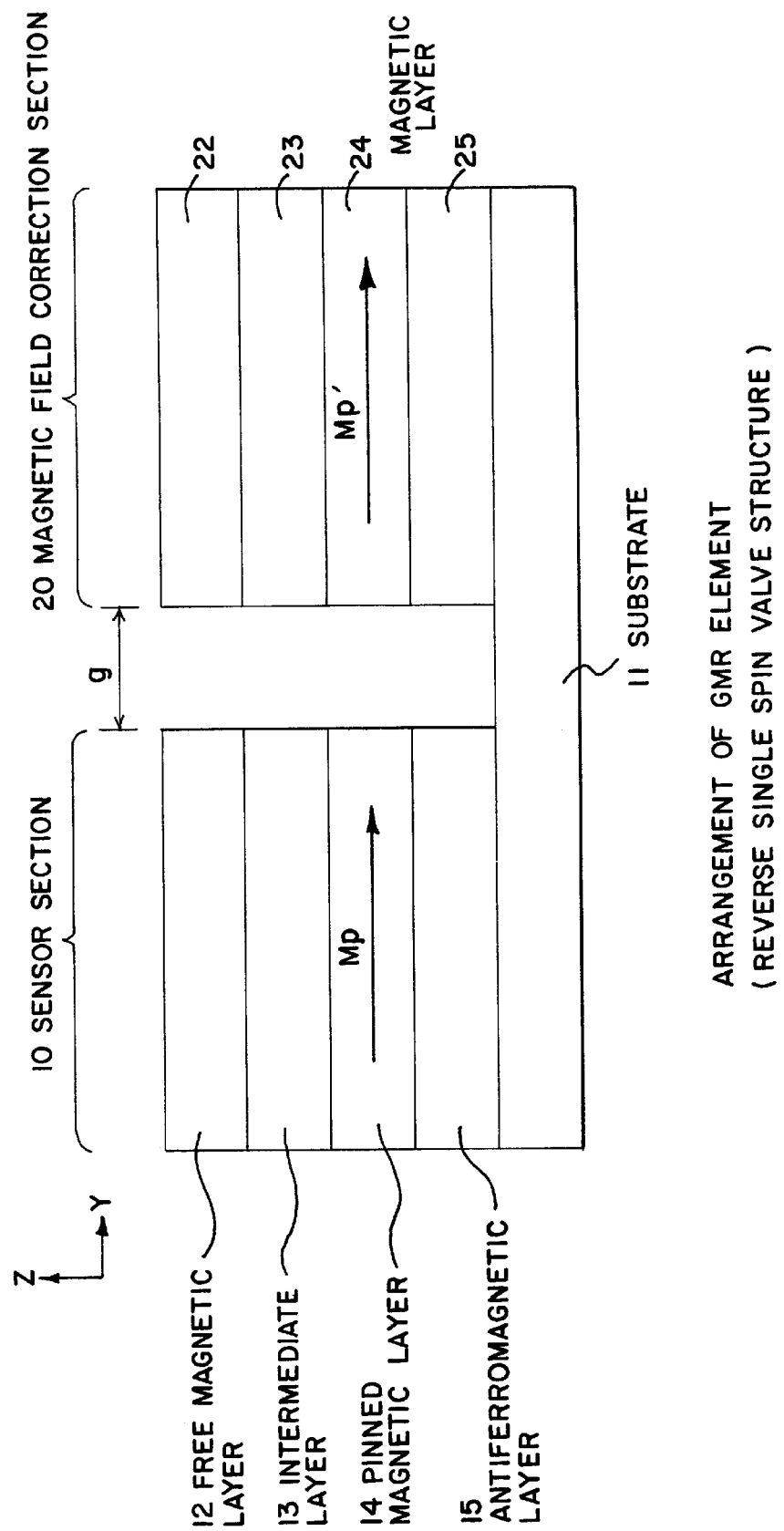
FIG. 9 is a cross section of a GMR element having a reverse single spin valve structure.

FIG. 9 illustrates a second GMR element of the invention. This GMR element differs from the first element (FIG. 7) in that the order of the layers are reversed. The arrangement of such GMR spin valve element having the reverse order of layers will be hereinafter referred to as reverse single spin valve structure.

The GMR element shown in FIG. 9 has a sensor section 10 and a magnetic field correction section 20 formed on a substrate 11. The sensor section 10 includes, in addition to a substrate 11, an antiferromagnetic layer 15 formed on the substrate 11, a fixed or pinned magnetic layer 14 formed on the antiferromagnetic layer, an intermediate layer formed on the pinned magnetic layer, and a free magnetic layer 12 formed on the intermediate layer, in the order mentioned. The antiferromagnetic layer 15 may be omitted if the pinned magnetic layer 14 is made of a hard magnetic material.

The magnetic field correction section 20 may have the same structure as the sensor section 10. In this case, the magnetic field correction section 20 includes an antiferromagnetic layer 25 formed on the substrate 11, a magnetic layer 24 formed on the antiferromagnetic layer, a non-magnetic intermediate layer 23 formed on the magnetic layer 24, and a magnetic layer 22 formed on the intermediate layer, in the order mentioned. Of these layers, only the magnetic layer 24 is inevitable in forming the magnetic field correction section 20.

As shown in FIG. 9, the reverse single spin valve GMR element is basically the same in structure as the GMR element shown in FIG. 4 except that the order of the layers is reversed. Accordingly, the operations of the GMR elements shown in FIGS. 4 and 9 are the same.

The features of the first GMR element as described in conjunction with FIGS. 8 and 12 also hold for the GMR element of FIG. 9. Further, if the magnetic layer 24 is formed on the antiferromagnetic layer 25 of the magnetic field correction section 20, the non-magnetic intermediate layer 23 and the magnetic layer 22 can be omitted.

THIRD EXAMPLE

FIG. 10 illustrates a third example of the invention, referred to as "dual spin valve structure" as contrasted to the first single spin valve structure of FIG. 5. The dual spin valve structure has a single spin valve structure of FIG. 7 (without the substrate) on top of the reverse single spin valve structure of FIG. 9 such that the free magnetic layer 12 is shared by the two spin valve structures located on the opposite sides thereof. Similarly, the magnetic layer 22 is shared by the two magnetic structures on the opposite sides thereof. The dual spin valve structure therefore has a plane symmetry in Z direction about the free magnetic layer 12.

A third dual spin valve structure as shown in FIG. 10 generally has a sensor section 10 and a magnetic field correction section 20 formed on a substrate 11. Beside the substrate 11, the sensor section 10 includes a first antiferromagnetic layer 15-1 formed on the substrate 11, a first pinned magnetic layer 14-1 formed on the first antiferromagnetic layer, a first intermediate layer 13-1 formed on the first pinned magnetic layer, a free magnetic layer 12 formed on the first intermediate layer, a second intermediate layer 13-2 formed on the free magnetic layer, a second pinned magnetic layer 14-2 formed on the second intermediate layer, and a second antiferromagnetic layer 15-2 formed on the pinned magnetic layer.

If either one or both of the pinned magnetic layer 14-1 and 14-2, respectively, of the GMR element is (are) made of a hard magnetic material, corresponding first and/or second antiferromagnetic layer(s) 15-1 and 15-2, respectively, can be omitted.

In the dual spin valve structure shown in FIG. 10, each of the layers may be structurally the same as the corresponding one of the single spin valve element of FIG. 4 except that it is reduced in thickness so that both GMR elements have the identical overall dimensions (i.e. the width w, height h, and spacing g). Alternatively, each of the layers of the dual spin valve structure may have the same size and the same composition as the corresponding layer of the single spin valve element.

The magnetic field correction section 20 may have the same layer structure as the sensor section 10. However, only the magnetic layers 24-1 and 24-2 associated with the first and the second pinned magnetic layers 14-1 and 14-2, respectively, are necessary for the magnetic field correction section 20. The magnetic field correction section 20 shown herein has the same layer structure as the sensor section 10 simply because it can be easily formed together with the sensor section 10 in its manufacture.

The first and the second pinned magnetic layers 14-1 and 14-2, respectively, have pinned magnetizations Mp1 and Mp2, respectively, in the direction of y axis as shown by solid arrows in FIG. 10. Since the magnetic field correction section 20 is formed together with the sensor section 10 in its manufacturing process, the magnetic layers 24-1 and 24-2 associated with the free magnetic layers 14-1 and 14-2, respectively, have their magnetizations Mp1' and Mp2' oriented in the same Y direction. However, it is not necessary to have the magnetic layers 24-1 and 24-2 magnetized in a specific direction during the process, since they are eventually aligned magnetically with the corresponding pinned layers as shown in FIG. 10 when the magnetizations Mp1 and Mp2 are pinned and the magnetic layers 14 are fixed.

It would be noted that the magnetic domains in the free magnetic layer 12 of the sensor section 10 are initially set to point in the direction which is about 90° to the magnetizations in pinned magnetic layers 14-1' and 14-2. It can be said that the magnetizations in the free magnetic layers 12 are weakly controlled to be normally orientated in this direction in that they are not fixed or pinned.

Thus, when the GMR element is placed in an externally applied signal magnetic field Hsig given by a magnetic disk (not shown), the magnetization Mf is rotated by the external magnetic field. The electric resistance of the spin valve film varies with the cosine of the angle q that the magnetizations Mf of the free magnetic layers 12 make with the magnetizations Mp. Because of these multiple magnetic-nonmagnetic interfaces in the dual spin valve element, the element has many advantageous features over a single spin valve element, providing a large change in electric resistance of the element.

By providing the spin valve element with a sense current (constant current) through a pair of electrode films formed at the opposite ends of the spin valve element, a change in electric resistance of the spin valve element caused by the field Hsig may be detected in the form of a voltage change across the spin valve element.

Figure 11:
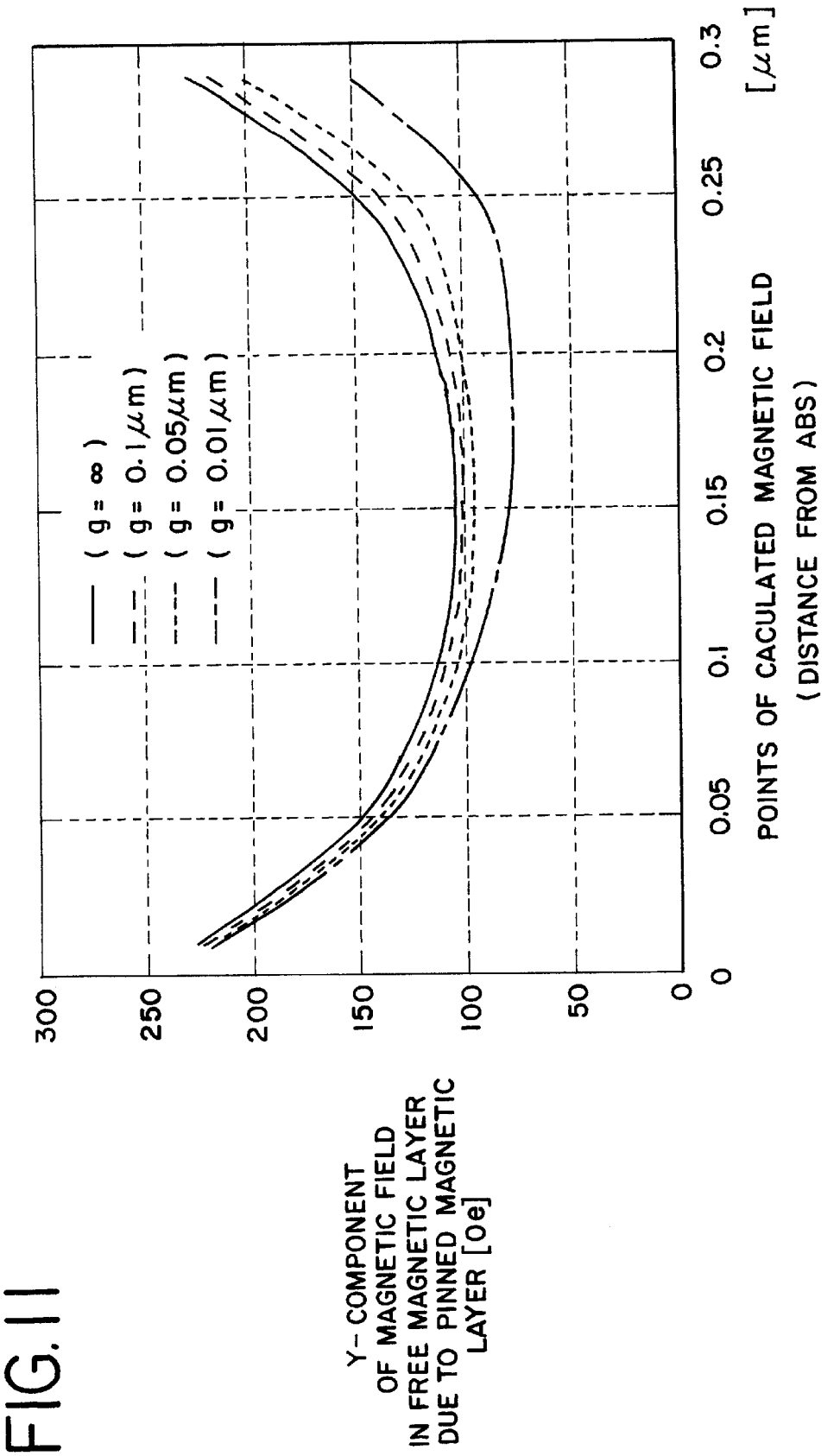
FIG. 11 is a graph showing the calculated distribution of magnetic field in the free magnetic layer in the dual spin valve structure shown in FIG. 10.

FIG. 11 illustrates a profile of the Y component (component in the direction of height) of a magnetic field in the free magnetic layer as calculated on the basis of an assumed dual spin valve structure. The graph compares to that of FIG. 8. The abscissa is graduated to the same scale as FIG. 8. The ordinate represents the magnetic field in unit of Oersted (Oe), up to 300 Oe, which is double that of FIG. 8, due to the fact that the magnetic contribution from the pinned magnetization layers is doubled in the dual spin valve structure.

As before, the solid curve represents the prior art case having no magnetic field correction section 20. It would be appreciated that, in comparison with the prior art, the magnetic field in the free magnetic layer 12 is suppressed by the magnetic field correction section 20.

It can be seen that the smaller the spacing g, the greater is the suppression of the leak field in free magnetic layer 12. For example, without a magnetic field correction section 20, the magnetic field is 107 Oe. On the other hand, with a magnetic field correction section 20, the magnetic field is 102 Oe for g=0.1 micrometers ($\mu$m), 96 Oe for g=0.05 micrometers ($\mu$m), and 82 Oe for g=0.01 micrometers ($\mu$m). Thus, the leak magnetic field in free magnetic layer 12 due to the pinned magnetic layers 14-1 and 14-2 decreases with spacing g.

Accordingly, as seen in the typical example of g=0.01 micrometers ($\mu$m), the magnetic field at a position (Y=0.15 micrometers) in the free magnetic layer 12 is reduced from 107 Oe (prior art) to 82 Oe (present invention).

In the GMR element shown in FIG. 10, the free magnetic layer 12 is superposed on one hand with the pinned magnetic layer 14-1 and intervened with the intermediate layer 13-1 between them, and on the other hand the free magnetic layer 12 is superposed with the second pinned magnetic layer 14-2 with the second intermediate layer 13-2 intervening between them. The free magnetic layer 12 and the first and the second pinned magnetic layers 14-1, 14-2 are magnetically coupled by exchange coupling, resulting in a reduction of the leak field in the free magnetic layer 12 which amounts to about 20 Oe for a single spin valve, and about 40 Oe for the dual spin valves, when the thicknesses of the first and the second intermediate layers 13-1 and 13-2 are about 24 Angstroms (Å).

By subtracting the exchange coupling field from the calculated field, the biasing field is found to be 42 Oe, which is smaller than 67 Oe by about 37%. The reduction in the biasing field may be interpreted due to the presence of the magnetic layers 24 of the field correction section 20 each disposed laterally adjacent to the corresponding pinned layers of the sensor section 10 of the dual spin valve element, weakening the magnetic exchange coupling of the pinned layers 14 with the free layers 12.

It would be understood that in this example also the same result could be obtained without pre-magnetizing the magnetic layers 24-1 and 24-2 in a specified direction, since these magnetic layers 24-1 and 24-2 would be eventually magnetized by the leak field of the pinned magnetic layers 14-1 and 14-2 of sensor section 10.

Figure 13A:
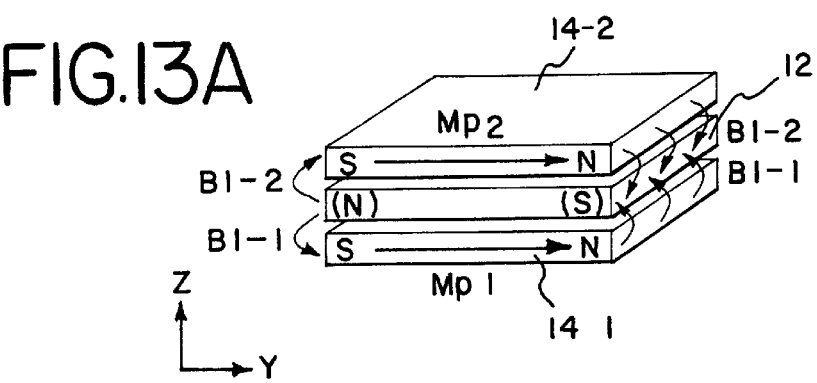
FIGS. 13A and 13B depict magnetization in the free magnetic layer of the GMR element as shown in FIG. 10.

FIGS. 13A and B depict the features of the dual spin valve GMR element in a simplified manner, which corresponds to FIG. 12 for a single spin valve element. For simplicity, all the components other than the free magnetic layers 12 and the pinned magnetic layers 14-1, 14-2 of the sensor section 10, and the magnetic layer 24 of the magnetic field correction section 20, have been omitted from FIG. 13. As shown in FIG. 13A, the pinned magnetic layers 14-1 and 14-2 are fixedly magnetized in the positive Y direction. Formed around the pinned magnetic layers 14-1 and 14-2 are magnetic fields. Without a magnetic field correction section as in the prior art element, a large part of the magnetic flux B1-1 and B1-2 leaking out of the pinned magnetic layers 14-1 and 14-2, respectively, reaches the free magnetic layer 12. Similarly, a large part of the magnetic flux leaking from the free magnetic layer 12 reaches pinned magnetic layer 14. Consequently, although the free magnetic layer 12 should ideally be magnetized in X direction, it is more or less magnetized towards the negative Y direction by the leak field.

Figure 13B:
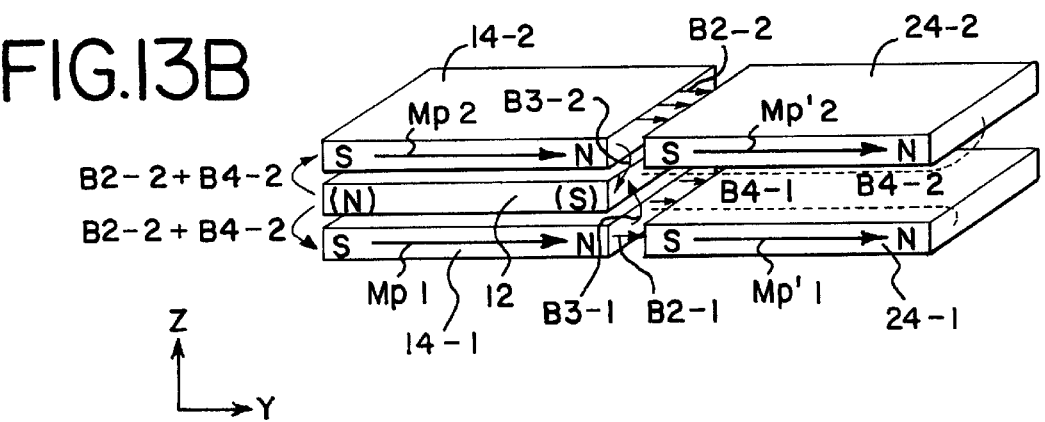

FIG. 13B illustrates a case in which the magnetic layers 24-1 and 24-2 are disposed laterally adjacent to (i.e. disposed side by side to), and spaced apart by a small distance from, the pinned magnetic layers 14-1 and 14-2, respectively. In principle, the magnetic layers 24-1 and 24-2 may be fabricated in the same manufacturing processes as the pinned magnetic layers 14-1 and 14-2, so that magnetic layers 24-1 and 24-2 are fixedly magnetized to Mp1' and Mp2', respectively, in the same direction (Y direction) as in the pinned magnetic layers 14-1 and 14-2.

In this case, a large part of the leak magnetic flux B2-1 and B2-2 from the pinned magnetic layers 14-1 and 14-2, respectively, reach the magnetic layers 24-1 and 24-2, so that only minor part of the leak fields B3-1 and B3-2 from the pinned magnetic layers 14-1 and 14-2, respectively, reach the free magnetic layer 12.

The magnetic flux B4-1 and B4-2 emerging from the other ends of magnetic layers 24-1 and 24-2, respectively, reach the free magnetic layer 12, but the magnetic flux densities thereof are diminished to one fourth at the end of the free magnetic layer 12, since magnetic flux density decreases with the square of the distance. The magnitude of the spacing g is not critical as described above.

As a result, the leak magnetic field in the free magnetic layer 12 arising from the pinned magnetic layers 14-1 and 14-2 are greatly reduced by the presence of magnetic layers 24-1 and 24-2, thereby minimizing possible magnetization of the free magnetic layer 12 in the negative Y direction. Thus, the magnetic layers 24 of the magnetic field correction section 20 facilitate holding the magnetization in the free magnetic layer 12 at the ideal angle of 90° relative to the magnetization in the pinned magnetic layer 14.

According to the invention, in a dual spin valve GMR head having dual pinned magnetic layers and a free magnetic layer in a sensor section, the leak magnetic field from the pinned magnetic layer and entering the free magnetic layer of the GMR head may be suppressed by providing a magnetic field correction section laterally adjacent to the sensor section, with the magnetic field correction section having a pinned magnetic layer magnetized in the same direction as in the pinned magnetic layer of the sensor section, thereby allowing for an adequate biasing for the sensor section.

FOURTH EXAMPLE

FIG. 14 illustrates a fourth embodiment of a GMR element having a super-lattice GMR element according to the invention. The super-lattice GMR has a sensor section 10 formed on a substrate 11, which includes multiple sets of magnetic layers in such a way that each set comprises either a free magnetic layer 12 coupled with an intermediate layer 13, or a free magnetic layer 12 coupled with an intermediate layer 13 and a pinned magnetic layer 14, and that each set is stacked together with an intervening non-magnetic layer 16 between them. The pinned magnetic layer 14 is made of a hard magnetic material, so that antiferromagnetic layers are not needed to fix the magnetizations in the respective pinned magnetic layers. The layers of the j-th set is denoted by the respective number of the layers, hyphenated with number j.

The sensor section 10 shown in FIG. 14 has n sets of such magnetic layers, separated by non-magnetic layers 16-1 through 16-n.

In addition, the super-lattice GMR element has a magnetic field correction section 20 having the same arrangement as the sensor section 10. It should be understood, however, that only magnetic layers 24-1 through 24-n are necessary for the magnetic field correction section 20.

If an external magnetic field is applied to the GMR element shown in FIG. 14, the magnetization in the free magnetic layer 12, having a weak coercive force, is rotated to align with the applied magnetic field. The electric resistance of the GMR element becomes minimum when the rotated magnetization becomes parallel with the magnetization in the pinned magnetic layer 14 ($\theta=0°$) and maximum when it becomes antiparallel ($\theta=180°$) therewith. The super-lattice GMR element has a feature that it exhibits a larger change in electric resistance than a single spin valve GMR element due to the fact the super lattice GMR element has many spin valve interfaces. However, manufacturing cost of a GMR element increases with multiplicity and complexity of layers involved in the GMR element.

The GMR element shown in FIG. 14 may be regarded as incorporating many single spin valve structures having no antiferromagnetic layers, with one spin valve stacked on another, so that the operation of the GMR element may be understood as similar to that of a single spin valve GMR element as shown in FIG. 1. Except that the super-lattice GMR element includes many non-magnetic interfaces between two neighboring single spin valve structures, the super-lattice GMR element has basically the same structure as the single spin valve GMR element shown in FIG. 5. Therefore, the GMR element also has the advantages and features of the single spin valve GMR element.

Method for Manufacturing GMR Head

A method for manufacturing the first through the fourth GMR elements will now be briefly described below.

FIG. 15 is a flow diagram showing a manufacturing process for a first GMR element (FIG. 5) having a single spin valve structure.

Figure 15A:
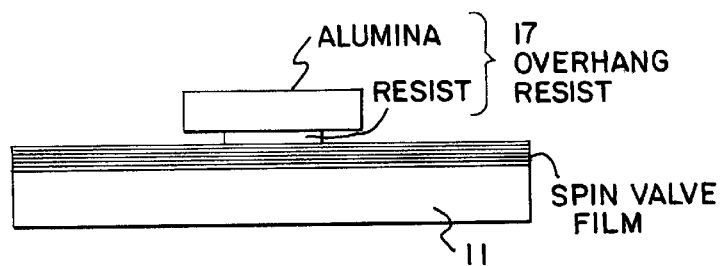
FIGS. 15A and 15E are flow-charts showing a process for manufacturing a GMR element as shown in FIG. 7.

As shown in FIG. 15A, each spin valve layer (i.e., a free magnetic layer 12, an intermediate layer 13, a pinned magnetic layer 14, and an antiferromagnetic layer 15) of a sensor section 10 and corresponding layers in a magnetic field correction section 20 are simultaneously sputtered on a substrate 11 in the sequence mentioned. Then, a double-layered photoresist 17, made of a resist and alumina or only a resist for lifting off, is deposited on the sensor section 10 and the magnetic field correction section 20 to protect them from subsequent ion-milling applied thereto.

Figure 15B:
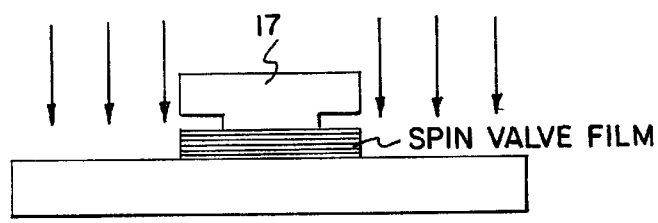

As shown in FIG. 15B, the sputtered portion is patterned using an ion-milling technique, and etched into three sections corresponding to the sensor section 10, the spacing section g, and the magnetic field correction section 20, respectively.

Figure 15C:
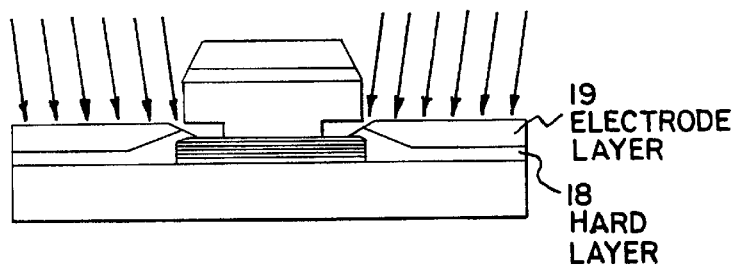

Then, a hard layer 18 serving as an underlayer and an electrode layer 19 are deposited, as shown in FIG. 15C. It is desirable for the sensor section 10 to have the underlayers and the electrodes on the opposite ends of the sensor section 10 so that a sense current is passed only through the free magnetic layer 12 in gaining a large resistance change, rather than through the sensor section 10 and the magnetic field correction section 20.

If a sense current were passed through both the sensor section 10 and the magnetic field correction section 20, the overall electric resistance change of the GMR element would be reduced, because magnetic field correction section 20 is remotely located from a magnetic disk (not shown), so that the change in magnetization, and hence in electric resistance, due to externally applied magnetic field Hsig would be relatively small in the magnetic field correction section 20. Therefore, the hard film 18 and the electrode film 19 are disposed only on the opposite ends of the sensor section 10 along the width thereof. However, it is much simpler, and hence less costly, to deposit a hard film 18 and an electrode film 19 on both ends of the sensor section 10 and the magnetic field correction section 20 along the width thereof. Therefore, it is a matter of a trade-off between manufacturing cost and pursuit of desirable GMR head characteristic.

Figure 15D:
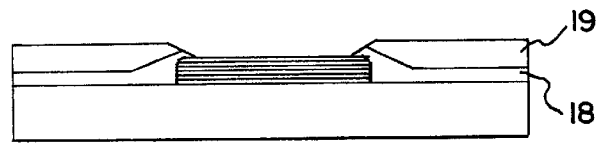

In the next step, the double-layered resist 17 is lifted off, as shown in FIG. 15D.

Figure 15E:
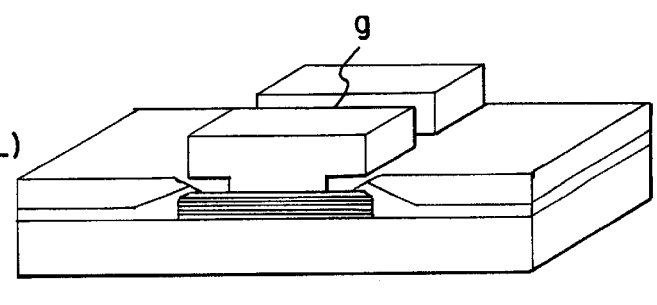

A double-layered resist 17g having a groove associated with the spacing g between the sensor section 10 and the magnetic field correction section 20 (refer to FIG. 5) is then formed, as shown in FIG. 15E. Thereafter, by means of an ion-milling method, a groove corresponding to the spacing g is formed, and then the double-layered resist is lifted off.

It should be understood that, although the GMR element shown in FIG. 5 has been shown to be fabricated through the procedure described above, it may be fabricated alternatively by another method such as a selective etching, a lift-off process, an ion milling, and a phototype processing known in the art.

The method used in fabricating the reverse single spin valve structure in the second example (FIG. 9) is identical to the method for the GMR element shown in FIG. 5, except that the layers are formed in the reverse order in the former case.

The method used in fabricating the third GMR element having a dual spin valve structure is identical to the method for the GMR element described in the second example, except that the second intermediate layer 13-2, the second pinned magnetic layer 14-2, and the second antiferromagnetic layer 15-2 are additionally formed in the former case.

The method for fabricating the fourth GMR element (FIG. 10) is identical to the method for the GMR element in the first example, except that the layers are formed in multiplicity as shown in FIG. 10 in the former case.

Magnetic Disk Drive

Figure 16:
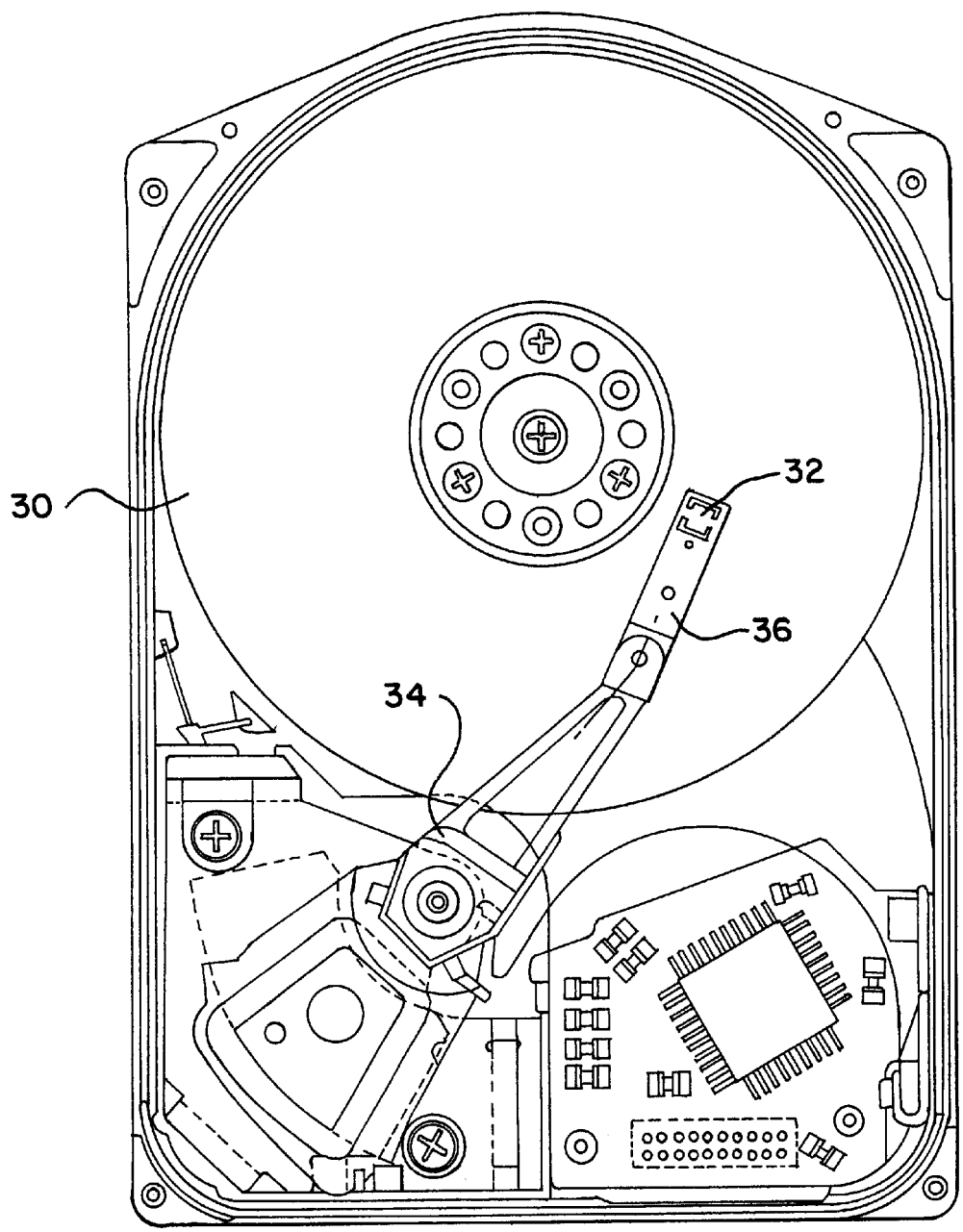
FIG. 16 is a plan view of a major portion of a magnetic disk drive utilizing any one of the GMR elements shown in FIGS. 5, 9, or 10.

FIG. 16 is a perspective view of a magnetic disk drive embodying the invention. The disk drive incorporates a GMR head manufactured in accordance with the invention. The magnetic disk drive includes a magnetic disk 30, and a GMR head 32 disposed above the magnetic disk 30 to face it in such a way that the GMR head 32 floats about 20 nm above the magnetic disk 30 during its read/write operation. The positioning of the GMR head 32 is done by a two-stage actuator 34 which is a combination of an ordinary actuator and an electromagnetic micro-actuator. An adhesion-free slider 36 is used to prevent adhesion of the slider with the magnetic disk.

Advantages or Effects of the Invention

In summary, the invention provides a novel GMR head in which an adequate bias point may be set for the free magnetic layer by suppressing the magneto-static field acting on the free magnetic layer due to the pinned magnetic layer.

The invention may further provide a method for manufacturing a novel GMR head mentioned above.

Finally, the invention may provide a magnetic disk drive utilizing any one of the GMR heads mentioned above.

What is claimed is:

1. A GMR head comprising;
   a sensor section including a GMR element; and
   an independent magnetic field correction section disposed laterally in the direction of height of said element, wherein
   said sensor section has at least a set of a free magnetic layer, an intermediate layer, and a pinned magnetic layer, and
   said magnetic field correction section has substantially the same structure as said sensor section.

2. The GMR head as recited in claim 1, wherein
   said sensor section has an antiferromagnetic layer, in addition to said free magnetic layer, intermediate layer and pinned magnetic layer.

3. The GMR head as recited in claim 1, wherein
   said sensor section has a single spin valve structure including said free magnetic layer, intermediate layer, pinned magnetic layer and an antiferromagnetic layer successively deposited on a substrate in the order mentioned.

4. The GMR head as recited in claim 1, wherein
   said sensor section has a reverse single spin valve structure including an antiferromagnetic layer, said pinned magnetic layer, intermediate layer and free magnetic layer successively deposited on a substrate in the order mentioned.

5. The GMR head as recited in claim 1, wherein
   said sensor section has a dual spin valve structure including at least a first pinned magnetic layer, a first intermediate layer, a free magnetic layer, a second intermediate layer and a second pinned magnetic layer successively deposited on a substrate in the order mentioned.

6. The GMR head as recited in claim 1, wherein
   said sensor section has a dual spin valve structure including at least a first antiferromagnetic layer, a first pinned magnetic layer, a first intermediate layer, a free magnetic layer, a second intermediate layer, a second pinned magnetic layer and a second antiferromagnetic layer deposited successively on a substrate in the order mentioned.

7. The GMR head as recited in claim 1, wherein
   said sensor section has a super-lattice GMR structure including multiple sets of layers, each set having a free magnetic layer, an intermediate layer, and a pinned magnetic layer, and separated from its neighboring sets by an intervening non-magnetic layer.

8. The GMR head as recited in claim 1, wherein
   said sensor section and said magnetic field correction section are spaced apart by a distance of not more than 0.1 micrometers in the direction of the height of said element.

9. The GMR head as recited in claim 1, wherein
   said sensor section and said magnetic field correction section are spaced apart by a distance of not more than 0.01 micrometers in the direction of the height of said element.

10. A GMR head comprising;
    a sensor section including a GMR element; and
    a magnetic field correction section arranged independently and laterally in the direction of height of said element, wherein
    said sensor section has at least a free magnetic layer, an intermediate layer and a pinned magnetic layer, and
    said magnetic field correction section has at least an independent magnetic layer which is arranged laterally in the direction of height of said element, thereby reducing the magnetic field in said free magnetic layer arising from said pinned magnetic layer.

11. A magnetic disk drive, comprising:
    (a) a GMR head including:
        (1) a sensor section including a GMR element;
        (2) a magnetic field correction section arranged independently and laterally in the direction of height of said element, wherein said sensor section has at least a free magnetic layer, and intermediate layer and a pinned magnetic layer; and
        (3) said magnetic field correction section has at least an independent magnetic layer which is arranged laterally in the direction of height of said element, thereby reducing the magnetic field in said free magnetic layer arising from said pinned magnetic layer, (b) a magnetic disk disposed to face said GMR head; and (c) a control mechanism for controlling said GMR head and said magnetic disk.

12. A GMR head, comprising:

a magnetic field correction section independently arranged in a line to a sensor section having a laminated structure which senses changes in an externally applied magnetic field, said magnetic field correction section having the same laminated structure as that of said sensor section; wherein a pinned magnetic layer of said sensor section and a magnetic layer of said magnetic field correction section are magnetized substantially in the same direction.

13. The GMR head as recited in any one of claims 10 through 9 or 12, wherein said magnetic layer of said magnetic field correction section and said pinned magnetic layer of said sensor section have substantially the same width.

14. The GMR head as recited in any one of claims 10 through 9 or 12, wherein said magnetic layer of said magnetic field correction section and said pinned magnetic layer of said sensor section having GMR element are spaced apart by a distance not more than 0.01 micrometers in the direction of height of said element.

15. The GMR head as recited in any one of claims 10 through 9 or 12, wherein said sensor section has a dual spin valve structure.

* * * * *

UNITED STATES PATENT AND TRADEMARK OFFICE
CERTIFICATE OF CORRECTION

PATENT NO.   : 6,327,121 B1
DATED        : December 4, 2001
INVENTOR(S)  : Nagasawa et al.

It is certified that error appears in the above-identified patent and that said Letters Patent is hereby corrected as shown below:

<u>Column 19,</u>
Line 14, delete "10 through 9" and insert -- 1 through 10 -- therefor; and <u>Column 20,</u>
Lines 4 and 11, delete "10 through 9" and insert -- 1 through 10 -- therefor.

Signed and Sealed this

Twenty-fifth Day of June, 2002

Attest:

JAMES E. ROGAN
Attesting Officer                 Director of the United States Patent and Trademark Office

UNITED STATES PATENT AND TRADEMARK OFFICE
CERTIFICATE OF CORRECTION

PATENT NO.    : 6,327,121 B1
DATED         : December 4, 2001
INVENTOR(S)   : Nagasawa et al.

It is certified that error appears in the above-identified patent and that said Letters Patent is hereby corrected as shown below:

<u>Title page,</u>
Item [75], Inventors, please delete "Keiichi Nagawasa" and insert
-- Keiichi Nagasaka --.

Signed and Sealed this

Fourth Day of March, 2003

JAMES E. ROGAN
*Director of the United States Patent and Trademark Office*